US009772056B2

(12) United States Patent
Swift et al.

(10) Patent No.: US 9,772,056 B2
(45) Date of Patent: Sep. 26, 2017

(54) TUBE CONNECTOR

(75) Inventors: Jonathan Clark Swift, Cambridgeshire (GB); Kurtis M. Horwath, Abingdon, VA (US); Shahram Totonchian, Abingdon, VA (US)

(73) Assignee: Gates Corporation, Denver, CO (US)

( * ) Notice: Subject to any disclaimer, the term of this patent is extended or adjusted under 35 U.S.C. 154(b) by 1326 days.

(21) Appl. No.: 12/380,920

(22) Filed: Mar. 5, 2009

(65) Prior Publication Data

US 2010/0225109 A1 Sep. 9, 2010

(51) Int. Cl.
*F16L 19/02* (2006.01)
*F16L 19/028* (2006.01)

(52) U.S. Cl.
CPC ....... *F16L 19/0225* (2013.01); *F16L 19/0206* (2013.01); *F16L 19/0283* (2013.01); *F16L 19/0286* (2013.01)

(58) Field of Classification Search
CPC .............. F16L 19/0225; F16L 19/0206; F16L 19/0283; F16L 19/0286
USPC ....... 285/313, 361, 362, 376, 377, 396, 402, 285/384, 385, 386, 389
See application file for complete search history.

(56) References Cited

U.S. PATENT DOCUMENTS

| | | | |
|---|---|---|---|
| 1,987,100 A * | 1/1935 | Burns | 285/62 |
| 2,077,035 A | 4/1937 | Bredeson | |
| 2,522,194 A * | 9/1950 | Richardson | 285/331 |
| 3,653,694 A | 4/1972 | Nicol | 285/334.4 |
| 3,992,043 A | 11/1976 | Whitley | 285/39 |
| 4,133,565 A * | 1/1979 | Shutt | 285/334.5 |
| 4,458,926 A | 7/1984 | Williamson | |
| 4,555,129 A | 11/1985 | Davlin | 285/3 |
| 4,805,945 A | 2/1989 | Foucault et al. | 285/341 |
| 5,002,316 A | 3/1991 | Chohan | 285/110 |

(Continued)

FOREIGN PATENT DOCUMENTS

| | | |
|---|---|---|
| EP | 0466371 A2 | 1/1992 |
| JP | 10103189 A | 4/1998 |

(Continued)

OTHER PUBLICATIONS

Gates Corporation, White Paper "The Leak-Free Threaded Hydraulic Coupling. Pipe Dream or Reality?"; 9 pages; Copyright 2008 Gates Corp., www.gates.com.

(Continued)

*Primary Examiner* — Gregory Binda
*Assistant Examiner* — Zachary Dragicevich
(74) *Attorney, Agent, or Firm* — Jeffrey A. Thurnau, Esq.; Paul N. Dunlap, Esq.

(57) ABSTRACT

A tube connector comprising a male portion having a male portion thread on an outer surface, a first tube having a first tube surface disposed at a seat angle ($\theta$) of approximately 37° to a tube connector centerline, the male portion having a clearance engagement with the first tube, a nut having a clearance engagement with a second tube, the nut engagable with the male portion thread, the second tube having a second tube surface disposed at a seat angle ($\theta'$) in the range of ($\theta'$)=($\theta$+x)°, were x=+0° up to 1°, and the first tube surface compressed by the nut and the male portion against the second tube surface for a sealing engagement between the first tube surface and the second tube surface.

8 Claims, 2 Drawing Sheets

(56) References Cited

U.S. PATENT DOCUMENTS

| | | |
|---|---|---|
| 5,135,269 A | 8/1992 | Babuder |
| 5,314,211 A | 5/1994 | Landhuis ...................... 285/110 |
| 5,340,163 A | 8/1994 | Merrer et al. .................. 285/93 |
| RE37,246 E | 6/2001 | Ridenour ................... 285/334.5 |
| 6,345,845 B2* | 2/2002 | Johnston ............... F16L 19/103 285/342 |
| 6,517,126 B1 | 2/2003 | Peterson et al. ........... 285/382.4 |
| 2003/0047945 A1 | 3/2003 | Schroeder et al. |
| 2007/0052236 A1* | 3/2007 | Wada ........................... 285/384 |
| 2008/0061555 A1 | 3/2008 | Knight ...................... 285/334.5 |

FOREIGN PATENT DOCUMENTS

| | | |
|---|---|---|
| JP | 2000240863 A | 9/2000 |
| JP | 2001248767 A | 9/2001 |
| JP | 2002310346 A | 10/2002 |
| JP | 2005133943 A | 5/2005 |
| KR | 19980043879 A | 9/1998 |

OTHER PUBLICATIONS

SAE International, Surface Vehicle Standard; "(R) Automotive Hydraulic Brake System—Metric Tube Connections"; SAE J 1290; Rev. Oct. 2002.

\* cited by examiner

US 9,772,056 B2

TUBE CONNECTOR

FIELD OF THE INVENTION

The invention relates to a connector having a male portion engagable with a nut, a first tube surface having a seat angle of approximately 37° is compressed against a cooperating second tube surface between the nut and the male portion for a sealing engagement between the first tube surface and the second tube surface.

BACKGROUND OF THE INVENTION

Generally, for the purpose of forming a tube joint, the outer end of the tube to be joined is first provided with a cylindrical sleeve, typically called a braze or weld spud, which can be anchored on the end of the tube, usually through brazing or welding. It is essential that the anchoring of the sleeve on the tube should not cause the formation of lines or zones of reduced strength, particularly if the tube is of small wall-thickness.

Other connections comprise fittings wherein the tube is first flared. Prior to being flared the tube end is inserted through a male threaded portion. The threaded portion presses the flared end against a cooperating surface to form a seal.

Representative of the art is SAE International Standard J1290 (Rev October 2002) which discloses a male tube nut for connecting a flared tube to a threaded port in a hydraulic brake system.

What is needed is a connector having a male portion engagable with a nut, a first tube surface having a seat angle of approximately 37° that is compressed against a cooperating second tube or coupling surface between the nut and the male portion for a sealing engagement between the first tube surface and the second tube surface. The present invention meets this need.

SUMMARY OF THE INVENTION

The primary aspect of the invention is a connector having a male portion engagable with a nut, a first tube surface having a seat angle of approximately 37° is compressed against a cooperating second tube or coupling surface between the nut and the male portion for a sealing engagement between the first tube surface and the second tube or coupling surface.

Other aspects of the invention will be pointed out or made obvious by the following description of the invention and the accompanying drawings.

The invention comprises a tube connector comprising a male portion having a male portion thread on an outer surface, a first tube having a first tube surface disposed at a seat angle (θ) of approximately 37° to a tube connector centerline, the male portion having a clearance engagement with the first tube, a nut having a clearance engagement with a second tube, the nut engagable with the male portion thread, the second tube having a second tube surface disposed at a seat angle (θ') in the range of (θ')=(θ+x)°, were x=+0° up to 1°, and the first tube surface compressed by the nut and the male portion against the second tube surface for a sealing engagement between the first tube surface and the second tube surface.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
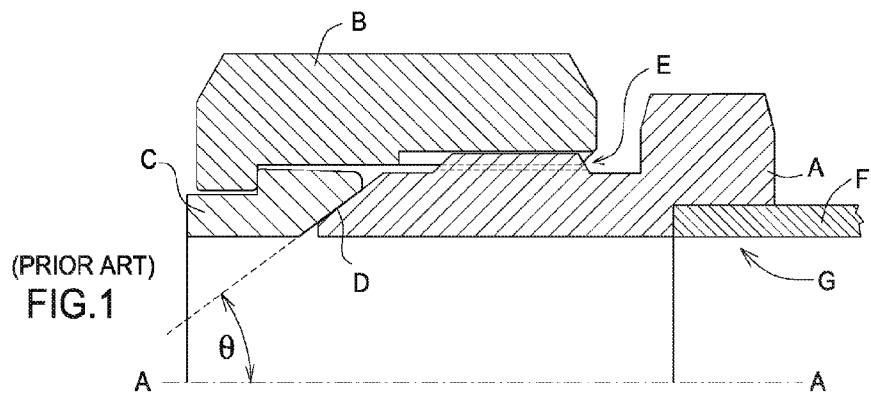
FIG. 1 is a cross-sectional view of the prior art.

FIG. 1. is a cross-sectional view of the prior art. A 37° "JIC" (Joint Engineering Council) coupling known in the art (A) is shown connected to a tube or coupling (C). Threaded nut (B) engages cooperating threads (E) on JIC connector (A). Cooperating surfaces between tube (C) and connector (A) at (D) are disposed at a seat angle (θ) of approximately 37° to a connector centerline A-A. Threaded portion (E) has a male configuration for engaging the female nut (B).

The prior art connector requires a tube (F) to be separately connected to the socket end (G) of connector (A). The connection is usually accomplished by brazing or welding to effect a non-leak connection. Tube (F) does not contact nor otherwise come into engagement with tube or coupling (C). The connection is sealed by the contact between JIC connector (A) and tube or coupling (C).

Figure 2:
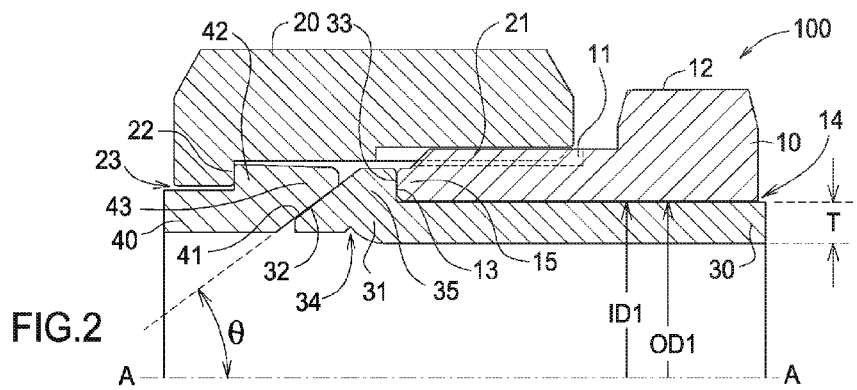
FIG. 2 is a cross-sectional view of the improved coupling using heavy wall tube.

FIG. 2 is a cross-sectional view of the improved coupling using heavy wall tube.

Connector 100 comprises a male connector portion 10, female nut portion 20, tube 30 and tube 40. The purpose of the connector is to make a high pressure connection between tube 30 and tube 40.

Portion 10 comprises threads 11 on an outer surface which cooperatively engage threads 21 on an inner surface of female nut portion 20. Portion 10 has an inside diameter (ID1) which is slightly greater than the outside diameter (OD1) of tube 30, resulting in a clearance 14 which creates a sliding fit between portion 10 and tube 30. There is a radial clearance 23 disposed between nut 20 and tube 40 which allows nut 20 to be rotated during installation on male portion 10 as tube 40 is drawn up to tube 30.

Alternatively, tube 30 may be mechanically expanded within portion 10 using methods known in the art, thereby preventing rotation of portion 10 with respect to tube 30 during torquing of nut 20. Alternatively, portion 10 may be clinched or compressed over the tube 30 to provide the same result. Other fastening methods include brazing, welding, soldering, glue or an interference fit.

End 31 of tube 30 comprises a flared surface 32. Surface 32 is disposed at a seat angle (θ) of approximately 37° to 39° to a connector centerline A-A.

End 43 of tube or coupling 40 is flared or machined. The outside diameter of shoulder 42 (OD42) exceeds the outside diameter (OD40) of the tube 40, see FIG. 3. Surface 41 of tube 40 comprises a seat angle (θ) of approximately 37° to 39° to cooperatively receive and engage surface 32. Shoulder 22 of nut 20 mechanically engages a shoulder 42 of tube 40 as the connector is made up.

In an alternate embodiment, surface 32 and surface 41 comprises a seat angle (θ) in the range of approximately 45° to 47°.

End 43 may also comprise an SAE dual angle design or a SAE universal design, each known in the art.

Surfaces 41, 32 are the sealing surfaces responsible for the fluid tight seal of the connector. Nut 20 is threaded onto portion 10 whereby shoulder 22 presses shoulder 42. Shoulder 15 through surface 13 compresses end 31 and surface 32 against surface 41 and shoulder 42, thereby creating the pressure tight seal.

In order to optimize the seal, the angle of surface 41 can be mismatched by being slightly greater than the angle of surface 32 in the range of approximately +0° up to +1°. Put another way, the angle for surface 41 can be in the range of:

$$(\theta')=(\theta+x)°$$

Where x=+0° up to 1°.

Further, as the connection is being fully torqued end 31 and end 43 have some limited flexibility which allows the connector to relieve, to some extent, manufacturing imperfections in the sealing surfaces 41, 32, as well as their orientation to each other. This helps decrease the cost to manufacture the connector by diminishing the need to control tolerances.

Figure 4:
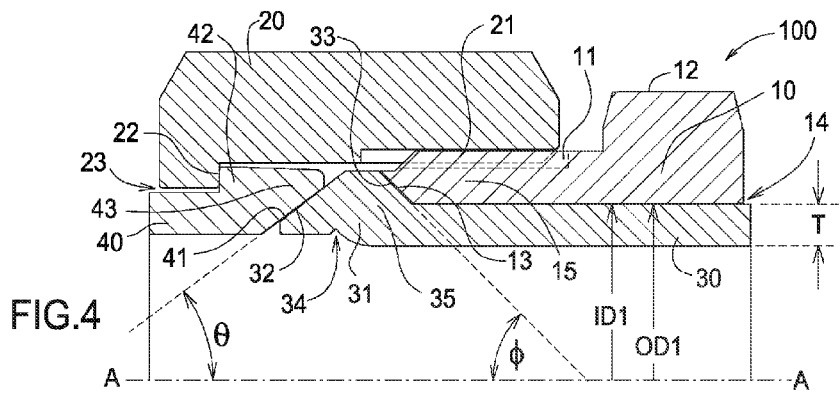
FIG. 4 is a cross-sectional view of the improved coupling using heavy wall tube in an alternate embodiment.

Surface 13 and surface 33 are shown extending in a radial direction substantially normal to A-A, however, in an alternate embodiment, surface 33 and surface 13 may extend at an angle (φ) in the range of approximately 30° to 50°, see FIG. 4.

Nut 20 comprises a hex shape when viewed in cross-section normal to A-A for engaging a wrench. Hex end 12 may also be used with a wrench to tighten the connector.

In this embodiment, notch 34 is minimal or non-existent. This is due to the relative thickness (T) of the heavy wall tube and is an artifact of the flaring process. During forming of the flare end 31, the material in shoulder 35 in a heavy wall tube is somewhat compressed which is sufficient to avoid formation of a significant notch 34. "Heavy wall" tube refers to tubing having a wall thickness (T) of up to 0.5" for 2" tubing.

Figure 3:
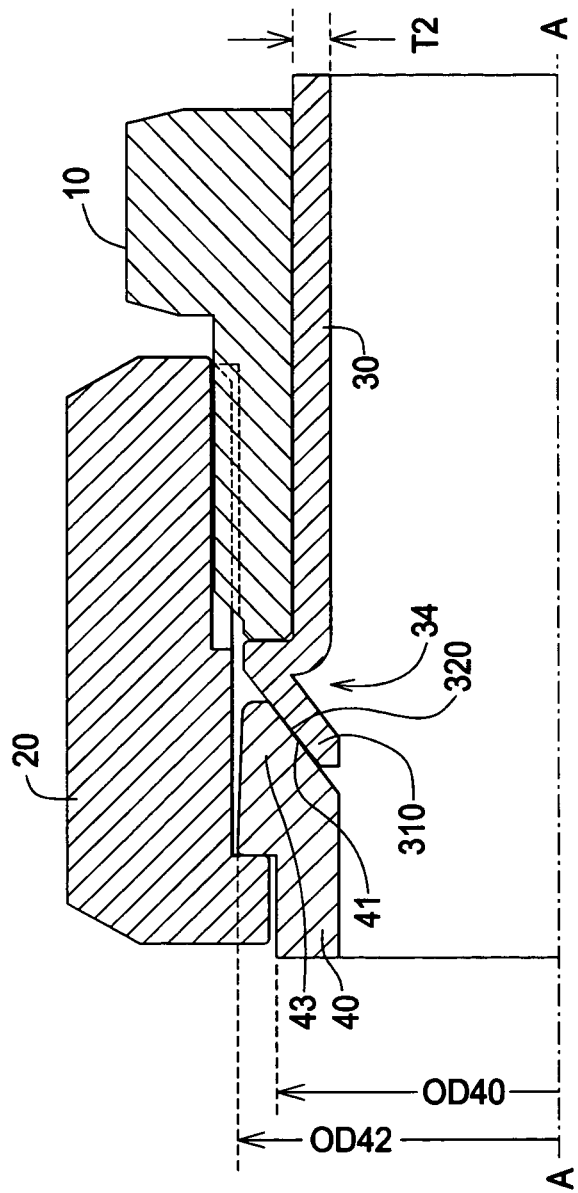
FIG. 3 is a cross-sectional view of the improved coupling using light wall tube.

FIG. 3 is a cross-sectional view of the improved coupling using thin wall tube. "Thin wall" tube refers to tubing having a wall thickness (T2) of up to 0.2" for 2" tubing.

In this alternate embodiment, the connector is as described in FIG. 2 except as follows. The thickness T2 is typical for a thin wall tube, namely T2<T. Notch 34 is formed as end 31 is flared or rolled. Flare portion 310 comprises substantially the same thickness T2 as the non-flared portion of the tube.

Due to its thinner cross-section, end 310 is somewhat flexible in a manner which allows end 310 to deform slightly by bending inward toward A-A as the connector is torqued. The force by which surface 320 engages surface 41 is also a function of the spring rate of the end 310. The spring rate is a function of the thickness T2 and the cantilever nature of end 310 as well as the contact between surface 41 and surface 320. As noted for FIG. 1, as the connection is being fully torqued end 310 and end 43 have some limited flexibility which allows the connector to relieve, to some extent, manufacturing imperfections in the sealing surfaces 41, 320 and/or their orientation to each other. This helps decrease the cost to manufacture the connector.

In both embodiments in FIG. 1 and FIG. 2, the tube 30 contacts tube 40 directly at surface 32 (or 320) and surface 41 respectively in order to form the pressure boundary. This allows the instant connector to avoid use of brazing to otherwise attach tube 30 to a socket end of connector 10, for example see (F), (G) and (A) FIG. 1. In turn, the surfaces requiring tight manufacturing tolerances for proper sealing are limited to the surfaces 32 (or 320), 41, and thereby the angle (θ). The engagement between portion 10 and tube 30, and portion 20 and tube 40 need only be loose, clearance fits suitable for threaded connections. This simplified configuration reduces manufacturing time and costs.

Although forms of the invention have been described herein, it will be obvious to those skilled in the art that variations may be made in the construction and relation of parts without departing from the spirit and scope of the invention described herein.

We claim:

1. A tube connector comprising:
   a male portion (10) having a male portion thread (11) on an outer surface;
   a first tube (30) having a first tube surface (32) disposed at a seat angle (θ) of approximately 37° to a tube connector centerline (A-A);
   the male portion having a clearance engagement with the first tube;
   a nut (20) having a clearance engagement with a second tube (40), the nut engagable with the male portion thread;
   the second tube having a second tube surface (41) disposed at a seat angle in the range of
   (θ+x)°, where x is 1°; and
   the first tube surface compressed by the nut and the male portion against the second tube surface for a sealing engagement between the first tube surface and the second tube surface.

2. The tube connector and in claim 1, wherein the male portion further comprises a male portion shoulder having an angle (φ) in the range of approximately 30° to 50°.

3. The tube connector as in claim 1, wherein the nut further comprises a nut shoulder for engaging the second tube.

4. The tube connector as in claim 1, wherein the male portion comprises a hex portion for engaging a wrench.

5. A tube connector comprising:
   a male portion (10) having a male portion thread (11) on an outer surface;
   a first tube (30) having a first tube surface (32) disposed at a seat angle (θ) of approximately 45° to a tube connector centerline (A-A);
   the male portion having a clearance engagement with the first tube;
   a nut (20) having a clearance engagement with a second tube (40), the nut engagable with the male portion thread;
   the second tube having a second tube surface (41) disposed at a seat angle in the range of
   (θ+x)°, where x is 1°; and
   the first tube surface compressed by the nut and the male portion against the second tube surface for a sealing engagement between the first tube surface and the second tube surface.

6. The tube connector and in claim 5, wherein the male portion further comprises a male portion shoulder having an angle (φ) in the range of approximately 30° to 50°.

7. The tube connector as in claim 5, wherein the nut further comprises a nut shoulder for engaging the second tube.

8. The tube connector as in claim 5, wherein the male portion comprises a hex portion for engaging a wrench.

* * * * *